(12) United States Patent
Holt (10) Patent No.: US 6,711,243 B1
(45) Date of Patent: Mar. 23, 2004

(54) SYSTEM AND METHOD FOR ROUTING A CALL TO A VOICE MAIL SYSTEM

(75) Inventor: Scott C. Holt, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/277,409

(22) Filed: Mar. 26, 1999

(51) Int. Cl.[7] .............................................. H04M 1/64
(52) U.S. Cl. ...................... 379/88.26; 379/207; 379/14; 370/390
(58) Field of Search ............... 379/211, 211.01–211.02, 379/88.23–88.26, 142.01, 142.05, 142.07, 201.01, 201.02, 207.13, 207.15, 210.01, 212.01, 221.08, 221.09, 221.1, 88.04, 88.08, 88.12, 88.16, 88.18, 114.01, 207.05; 370/390

(56) References Cited

U.S. PATENT DOCUMENTS

| | | | | |
|---|---|---|---|---|
| 5,566,235 A | * | 10/1996 | Hetz | 379/201 |
| 5,991,377 A | * | 11/1999 | Malik | 379/211 |
| 6,085,101 A | * | 7/2000 | Jain et al. | 370/390 |
| 6,185,282 B1 | * | 2/2001 | Boeckman et al. | 379/207.15 |
| 6,215,857 B1 | * | 4/2001 | Kasiviswanathan | 379/88.08 |
| 6,263,056 B1 | * | 7/2001 | Gruchala et al. | 379/114.01 |
| 6,301,349 B1 | * | 10/2001 | Malik | 379/211 |
| 6,317,484 B1 | * | 11/2001 | McAllister | 379/88.04 |
| 6,330,308 B1 | * | 12/2001 | Cheston et al. | 379/88.04 |
| 2001/0012354 A1 | * | 8/2001 | Silver | 379/221.08 |

* cited by examiner

Primary Examiner—Fan Tsang
Assistant Examiner—Geraldo Gauthier
(74) Attorney, Agent, or Firm—Cantor Colburn LLP (57) ABSTRACT

Routing a call to a voice mail system using subscriber information maintained in a database associated with a service control point. Once a call is received by the service node and the service node determines that a voice mail call should be originated, the service node sends a message including a voice mail indicator and a subscriber identifier to the service switching point. The service switching point uses the subscriber identifier to query the service control point for routing information. The service control point determines the voice mail access number associated with the subscriber using a database associated with the service control point. The service control point responds to the service switching point by providing the voice mail access number associated with the subscriber and setting the original called party number and the last redirecting party number to the directory number of the subscriber. The service switching point completes the call from the service node to the voice mail system using the information provided by the service control point.

18 Claims, 5 Drawing Sheets

SYSTEM AND METHOD FOR ROUTING A CALL TO A VOICE MAIL SYSTEM

TECHNICAL FIELD

This invention relates in general to call routing, and more particularly to routing a voice mail call between an adjunct network element, such as a service node, and a voice mail system.

BACKGROUND OF THE INVENTION

Some call management services provide a "revert to voice mail" feature. For example, call screening plans allow a subscriber to screen incoming calls. The subscriber is typically provided with information about the call, such as the calling number and/or the name of the calling party. Based upon the calling number and/or the name of the calling party, the subscriber can decide whether to answer the call or to allow the call to be directed to the subscriber's voice mail.

Other call management services also provide a revert to voice mail feature. For example, call forwarding services allow a subscriber to specify that a call placed to the subscriber's directory number be forwarded to another number if the subscriber cannot be reached using the subscriber's directory number. If the call is unanswered at both numbers or if both numbers are busy, then the call is routed to the subscriber's voice mail.

Call management services that provide a revert to voice mail feature typically use a service node ("SN") to originate a call to the subscriber's voice mail. To route the call to the subscriber's voice mail, subscriber information is maintained on the SN. The subscriber information associates a voice mail access number with a subscriber's directory number. Once a call is received by the SN, the SN determines the voice mail access number that is associated with the subscriber by accessing the subscriber information. The SN originates a call using the voice mail access number and then outputs the voice mailbox number for the subscriber using a tone generation circuit.

A disadvantage of maintaining subscriber information on the SN is that not all SN's support the storage of subscriber information. Typically, an SN that supports the storage of subscriber information is more complex and more expensive than an SN that does not support the storage of subscriber information. In addition, if only some of the SN's in the telephone network support the storage of subscriber information, then calls to voice mail must be routed through the SN's that contain the subscriber information. If an SN that contains subscriber information goes out of service, then it may not be possible to route a call to voice mail because the subscriber information may not be otherwise available. Therefore, there is a need for a system and method for routing a call to voice mail that does not require the storage of subscriber information on the SN.

Another disadvantage of the current method includes the requirement for a tone generation circuit on the SN. A tone generation circuit is required on the SN to output the voice mailbox number. The SN outputs the voice mailbox number because the call integration information does not unambiguously identify the voice mailbox of the subscriber. The call integration information is sent to the voice mail system ("VMS") via a Simplified Message Desk Interface ("SMDI"). The call integration information is ambiguous because the call integration information is not consistently derived. In some instances, the call integration information is derived from the original called party number. In other instances, the call integration information is derived from the last redirecting party number which is affected by any previous call forwarding. Because the call integration information is not consistently derived, the call integration information cannot be relied upon to identify the subscriber's voice mailbox. Thus, there is a need for a system and method for routing a call to voice mail where the call integration information can be used to identify the subscriber's voice mailbox so that a tone generation circuit is not required on the SN.

SUMMARY OF THE INVENTION

The present invention meets the needs described above by providing a system and method for routing a call to voice mail that does not require maintaining subscriber information on the service node. The subscriber information is maintained in a database associated with the service control point instead of in a database in the service node. The present invention also eliminates the need for a tone generation circuit on the service node to output the voice mailbox number because the call integration information can be used to identify the subscriber's voice mailbox.

A call is received by a service node ("SN") or other intelligent peripheral as part of a call management service, such as call screening or call forwarding. The SN determines whether a call should be originated to the voice mail system ("VMS"). If a voice mail call is originated by the SN, the SN sends a message including an access code and a subscriber identifier to the service switching point ("SSP"). The access code identifies the call as a voice mail call. The SSP uses the subscriber identifier to query the service control point ("SCP") for routing information. The SCP determines the voice mail access number associated with the subscriber using a database associated with the SCP. The SCP responds to the SSP by providing the voice mail access number associated with the subscriber and setting the original called party number and the last redirecting party number to the directory number of the subscriber. By setting both the original called party number and the last redirecting party number to the directory number of the subscriber, the voice mailbox of the subscriber is unambiguously identified. The SSP completes the call from the SN to the voice mail system using the routing information provided by the SCP. The SN is not required to output the voice mailbox number for the subscriber.

In one aspect of the invention, the query to the SCP from the SSP includes two query messages, an INFO_ANALYZED query message and a TERMINATION_ATTEMPT query message. The SCP responds to the INFO_ANALYZED query message with an ANALYZE_ROUTE response message and responds to the TERMINATION_ATTEMPT query message with a FORWARD_CALL response message. In another aspect of the invention, the query to the SCP from the SSP is a single query message, such as an INFO_ANALYZED query message. The SCP responds to the INFO_ANALYZED query message with a response message, such as an ANALYZE_ROUTE response message. Alternatively, other types of query messages and response messages can be used to communicate to the SCP that the call is a voice mail call for the identified subscriber and to communicate the voice mail access code from the SCP.

These and other aspects, features and advantages of the present invention may be more clearly understood and appreciated from a review of the following detailed description of the disclosed embodiments and by reference to the appended drawings and claims.

DETAILED DESCRIPTION OF THE INVENTION

The present invention is directed to a system and method for routing a call to a voice mail system. The present invention can be used in connection with any call management service that provides a "revert to voice mail" feature. For example, some call screening plans provide a revert to voice mail feature if the call is not answered by the called party. In addition, some call forwarding services provide a revert to voice mail feature if the call cannot be completed to the called party.

Briefly described, the present invention uses subscriber information maintained in a database associated with the service control point to route a call to voice mail. If a call is received by the service node that is associated with a call management service, such as call screening or call forwarding, the service node determines whether a voice mail call should be originated. If a voice mail call is originated, then the SN sends a message including an access code and a subscriber identifier to the service switching point. The service switching point uses the subscriber identifier to query the service control point for routing information. The service control point determines the voice mail access number associated with the subscriber using a database associated with the service control point. The service control point responds to the service switching point by providing the voice mail access number associated with the subscriber and setting the original called party number and the last redirecting party number to the directory number of the subscriber. The service switching point completes the call from the service node to the voice mail system using the information provided by the service control point.

Public Switched Telephone Network

Figure 1:
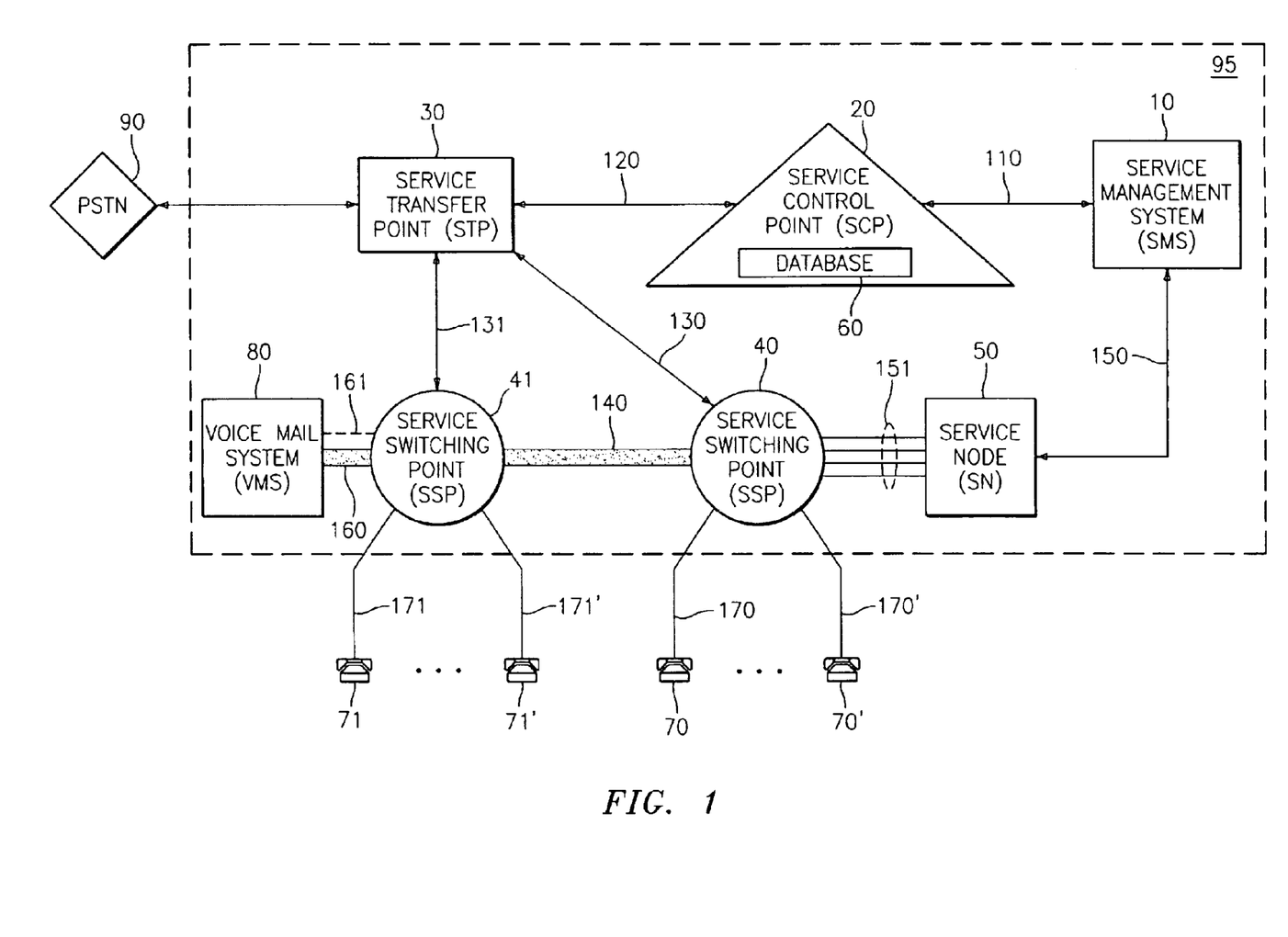
FIG. 1 is a block diagram of a portion of the PSTN illustrating an exemplary operating environment for an embodiment of the present invention.

FIG. 1 is a diagram depicting a representative portion of the public switched telephone network 95. Generally, the public switched telephone network is comprised of a variety of interconnected computer systems. The representative portion of the public switched telephone network 95 in FIG. 1 comprises a Service Management System ("SMS") 10, a Service Control Point ("SCP") 20, a Service Transfer Point ("STP") 30, Service Switching Points ("SSP's") 40 and 41, and a Service Node ("SN") 50.

The SMS 10 performs the high-level operations of the telephone network. The functions of the SMS 10 include: (a) downloading information to SCP 20 databases 60 when new subscribers are added or subscribers modify their ensemble of services; (b) performing data reloads when a SCP 20 crashes or software needs to be updated; (c) implementing high volume routing services, such as call forwarding and 800 number translation and routing; (d) maintaining and providing access to high volume databases for the authorization of billing, such as credit card number validations; and (e) downloading, on a non-real-time basis, billing information that is needed in order to appropriately invoice telephone company subscribers for the services provided.

The SCP 20 and the SMS 10 are interfaced over a digital data link 110. The SCP 20 operates in the telephone network to maintain a network database 60 that stores subscriber information. The subscriber information supports enhanced services, such as call forwarding.

The SN 50 and the SMS 10 are interfaced over a digital data link 150. SSP's typically interface to an SN via an ISDN link such as ISDN link 151 between SSP 40 and SN 50. However, the present invention does not require an ISDN link between the SSP and the SN. Generally, SSP's operate by transmitting trigger messages or queries to other components and by receiving and processing response messages from the other components. A trigger message indicates an event or a state change has occurred at an SSP. When a set of predetermined conditions are detected, the SSP 40, 41 operates to (a) initiate a trigger associated with the specific call processing state for the present call on a subscriber line, (b) generate and transmit an appropriate query message to another network component, and (c) suspend call processing for the present call until a response is received from the component. The received response message instructs the SSP 40, 41 to take certain actions in processing the present call. If the SSP 40, 41 does not receive a response from the network component, a default task will be executed upon the expiration of a default timer. As a specific example, when a call setup attempt is received at the SSP 40, 41, a TERMINATION_ATTEMPT query message is transmitted to the SCP 20.

SSP's can also be connected to each other via a trunk circuit. SSP's 40 and 41 are connected in this manner via trunk circuit 140. The trunk circuits provide the physical voice paths between parties. Each SSP 40, 41 services several subscriber lines. SSP 40 is shown as interfacing with termination equipment 70–70' via subscriber lines 170–170'. Likewise, SSP 41 services termination equipment 71–71' via subscriber lines 171–171'.

STP's in the network are utilized in linking the SSP's to the SCP's. In FIG. 1, SCP 20 interfaces to STP 30 via digital data line 120 and STP 30 interfaces with SSP 40 and 41 via digital data links 130 and 131 respectively. Digital data packets flowing between the SCP 20 and the SSP's 40, 41 go through STP 30. Thus, the STP 30 is not normally the destination of a packet, but merely directs traffic among the other entities on the network that generate and respond to the data packets. The public switched telephone network 95 can also interface to a non-SSP switch, a cellular network, or a private phone system.

FIG. 1 also illustrates that a voice mail system ("VMS") 80 is connected by a trunk line 160 and a Simplified Message Desk Interface ("SMDI") 161 to an SSP 41. Generally, a voice mail system is a system to record, store, retrieve and perform other functions related to voice mail messages that can be left by callers for a particular subscriber. A VMS 80 is connected to the PSTN so that the VMS 80 can serve more than one subscriber. A VMS 80 typically includes a voice mailbox for each subscriber identified by a voice mail access number.

Routing a Call to a Voice Mail System

Figure 2:
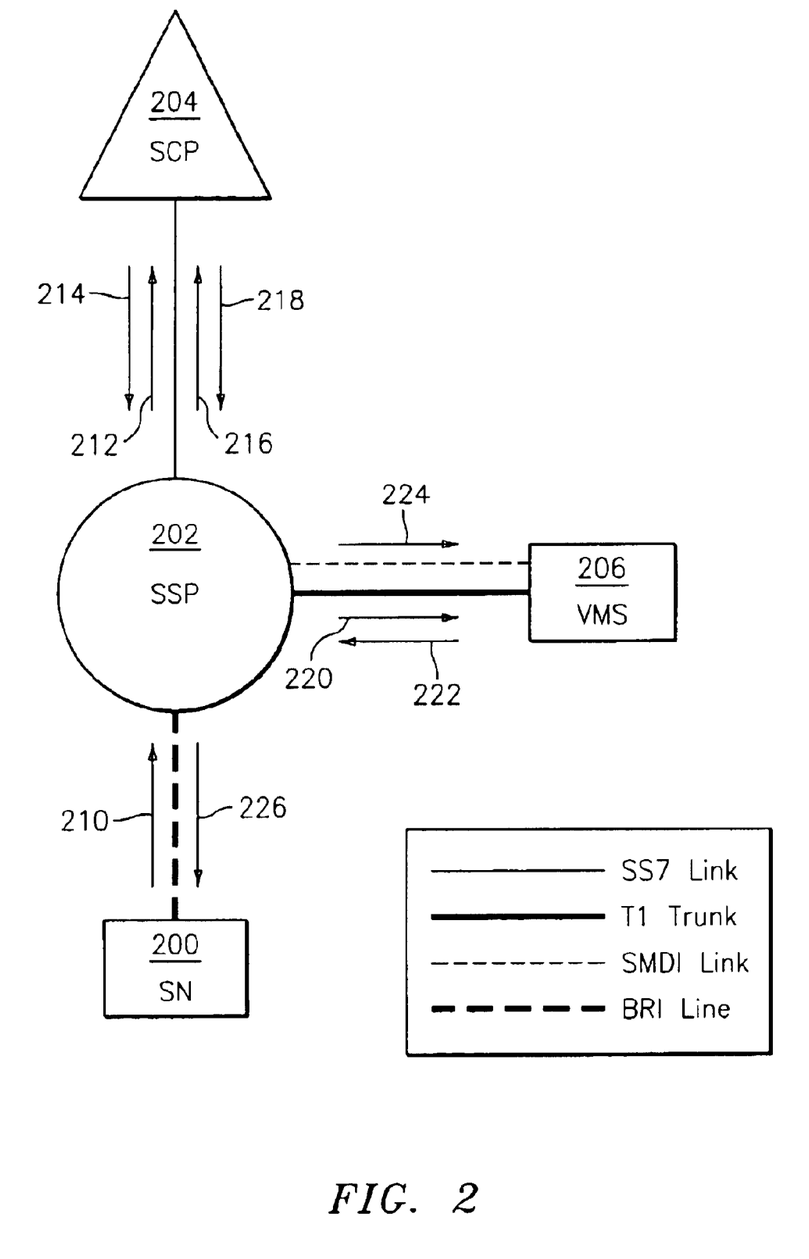
FIG. 2 is a block diagram illustrating the interaction between the components of FIG. 1, in accordance with an embodiment of the present information.

FIG. 2 illustrates the interactions between the SN 200, the SSP 202, the SCP 204, and the VMS 206 in an embodiment of the present invention. For simplicity, the STP is not illustrated in FIG. 2. Although FIG. 2 illustrates an SN, an intelligent peripheral could also be used. A service logic program executes on the SN 200 and determines whether a call should be placed to the VMS 206. Once the service logic program determines that a call should be placed to the VMS 206, then preferably a custom dialing pattern ("CDP") trigger occurs. A CDP is a pre-defined dialing pattern that includes an access code followed by a number of digits. The end of the dialing pattern is typically indicated by a pound sign ("#"). The access code indicates that the call is a voice mail call and the digits identify the subscriber associated with the voice mailbox where the call should be routed. For example, if the access code is "*90" and the subscriber is identified by the digits "4045558888", then the CDP is "*904045558888#". Preferably, the subscriber is identified by the directory number for the subscriber. However, the subscriber could be identified by another type of subscriber identifier.

A message 210 containing a voice mail indicator and a subscriber identifier is sent from the SN to the SSP. Preferably, the voice mail indicator is the access code and the subscriber identifier is the directory number for the subscriber specified in the CDP. In response to receiving the message containing the CDP, the SSP 202 launches a query message to the SCP 204. In one embodiment, the SSP 202 launches an INFO_ANALYZED query message 212 to the SCP 204. The parameters of the INFO_ANALYZED query message 212 include the digits from the CDP. In response to receiving the INFO_ANALYZED query message 212, the SCP 204 sends an ANALYZE_ROUTE response message 214 back to the SSP 202. The ANALYZE_ROUTE response message 214 indicates that the original called party number or CALLED_PARTY_ID parameter is set to the directory number of the subscriber. Setting the original called party number to the directory number of the subscriber instructs the SSP 202 to route the call to the subscriber's directory number. The ANALYZE_ROUTE response message 214 also includes additional parameters that identify the call as an attempt to reach the voice mailbox of the subscriber. For example, the CHARGE_PARTY parameter is set to a pre-defined value that is recognized by the SCP 204 as an attempt to reach the voice mailbox of the subscriber.

Once the SSP 202 receives the ANALYZE_ROUTE response message 214, the SSP 202 begins the call termination process. The start of the call termination process causes a termination attempt trigger ("TAT") which results in the SCP sending a TERMINATION_ATTEMPT query message 216 to the SCP 204. In response to receiving the TERMINATION_ATTEMPT query message 216, the SCP 204 reviews the parameters included in the previous ANALYZE_ROUTE response message 214 to determine whether the call is an attempt to reach the voice mailbox of the subscriber. Because the parameters indicate that the call is an attempt to reach the voice mailbox of the subscriber, the SCP 204 determines the voice mail access number for the call. The SCP 204 determines the voice mail access number by searching the database associated with the SCP 204 for the voice mail access number that corresponds to the subscriber's directory number. The SCP 204 includes the voice mail access number in a FORWARD_CALL response message 218 to the SSP 202. The FORWARD_CALL response message 218 also sets the last redirecting party number to the subscriber's directory number.

The SSP 202 sets up a call 220 to the VMS 206 and sends call integration information 224 over the VMS's Simplified Message Desk Interface ("SMDI") link. The call integration information 224 identifies both the original called party number and the last redirecting party number as the subscriber's directory number. Therefore, the call is correctly identified as bound for the subscriber's mailbox regardless of whether the call integration information is derived using the original called party number or the last redirecting party number. Once, the VMS answers the call 222, the SN is connected 226 to the VMS 206.

The present invention utilizes a database associated with the SCP that includes subscriber information. The database associated with the SCP can be built using the SMS in a manner that it known to those skilled in the art. Alternatively, the database could be built dynamically. For example, a subscriber could access a menu of options which allow the subscriber to enable a service, such as call forwarding, to revert to voice mail upon certain conditions. The menu could be accessed using a code, such as a star code. A star code is entered by depressing the star key "*" followed by one or more numeric keys. Once the menu is accessed, the subscriber is prompted for information, including the subscriber's identifier. In one embodiment, the subscriber's identifier is the subscriber's directory number. The information is used to build a database in the SCP that associates the subscriber's identifier with the voice mail access number for the subscriber's voice mailbox.

Figure 3:
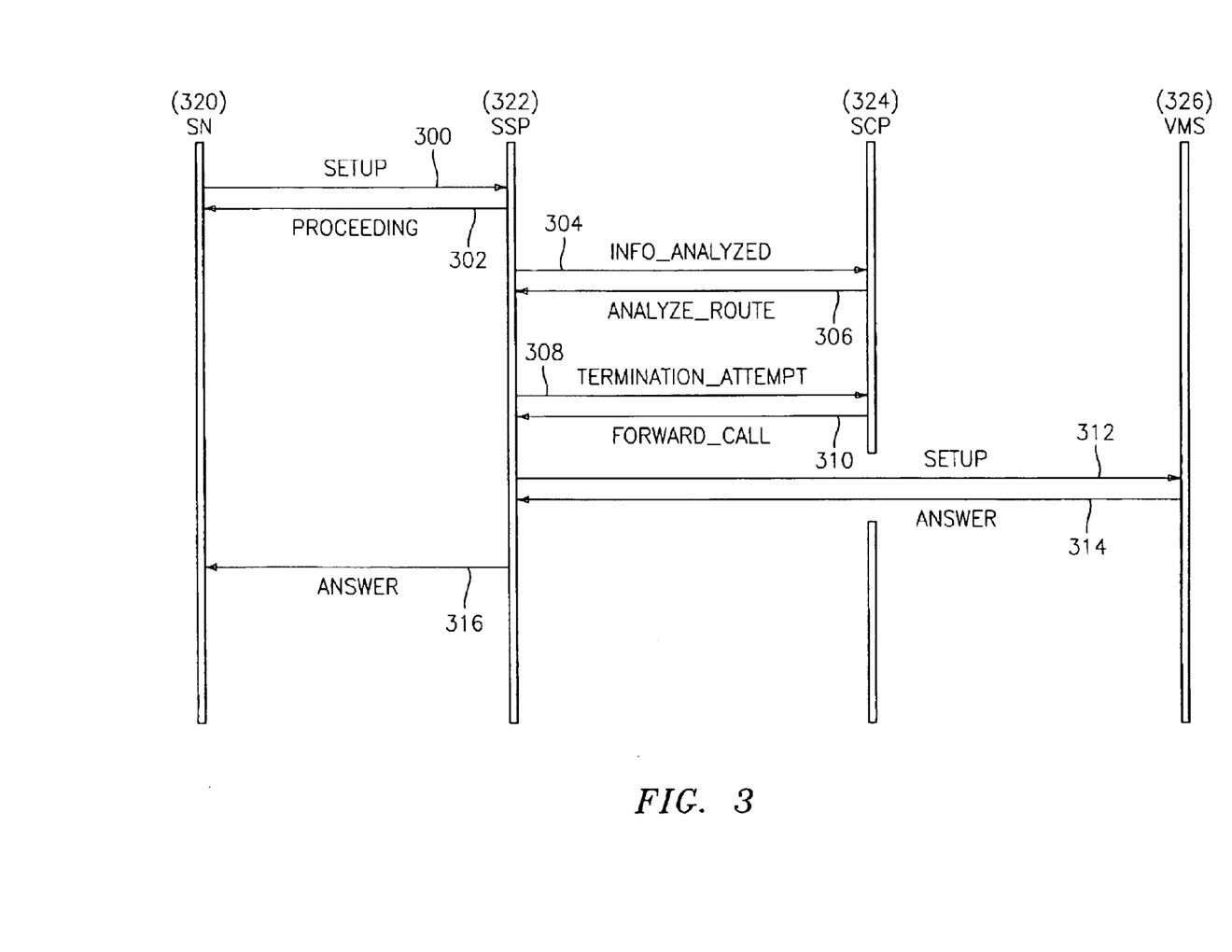
FIG. 3 is a block diagram illustrating the messaging between the components of FIG. 1, in accordance with an embodiment of the present information.

The messaging between the SN, the SSP, the SCP, and the VMS can be further illustrated by reference to FIG. 3. The vertical lines in FIG. 3 represent the elements of the telephone network. The horizontal lines shown in FIG. 3 illustrate the messaging between the elements. The messaging begins with the SETUP 300 message and the PROCEEDING 302 message between the SN 320 and the SSP 322. The SETUP 300 message includes the CDP, as described above in connection with FIG. 2. In response to receiving the message including the CDP, the SSP 322 causes an INFO_ANALYZED query message 304 to be sent to the SCP 324. The SCP 324 responds to the INFO_ANALYZED query message 304 with an ANALYZE_ROUTE response message 306. The ANALYZE_ROUTE response message 306 sets the original called party number to the subscriber's directory number. Setting the original called party number to the subscriber's directory number instructs the SSP 322 to route the call to the subscriber's directory number.

Upon receipt of the ANALYZE_ROUTE response message 306, the SSP 322 sends a TERMINATION_ATTEMPT query message 308 to the SCP 324. The SCP 324 determines that the call is a voice mail call and responds with a FORWARD_CALL response message 310 that indicates that the call should be forwarded to the voice mail access number included in the response message. The FORWARD_CALL response message 310 also indicates that the last redirecting party number for the call should be set to the subscriber's directory number. Upon receipt of the FORWARD_CALL response message 310, the SSP 322 sets up a call 312 to the VMS 326 and sends call integration information over the SMDI link. Once the VMS 326 answers the call 314, the SN 320 completes the call 316. For example, the SN 320 can complete the call by connecting the VMS 326 to a previously existing call or executing a call transfer operation to connect the voice mail call to a previously existing call.

Alternative Embodiment for Routing a Call to a Voice Mail System

FIGS. 2 and 3 illustrate that two sets of messages are sent between the SSP and the SCP. The first set of messages includes the INFO_ANALZYED query message and the ANAYLZE_ROUTE response message. The second set of messages includes the TERMINATION_ATTEMPT query message and the FORWARD_CALL response message. In an alternative embodiment of the present invention, the two sets of messages are replaced with a single set of messages. The single set of messages provide the same functions provided by the two sets of messages. Specifically, the single set of messages sets both the original called party number and the last redirecting party number to the subscriber's directory number. The single set of messages also instructs the SSP to route the call to the VMS. The single set of messages between the SSP and SCP could use an INFO_ANALYZED query message and an ANALYZE_ROUTE response message. However, as will be apparent to those skilled in the art, other types of query messages and response messages could also be used. This alternative embodiment is illustrated in FIGS. 4 and 5.

Figure 4:
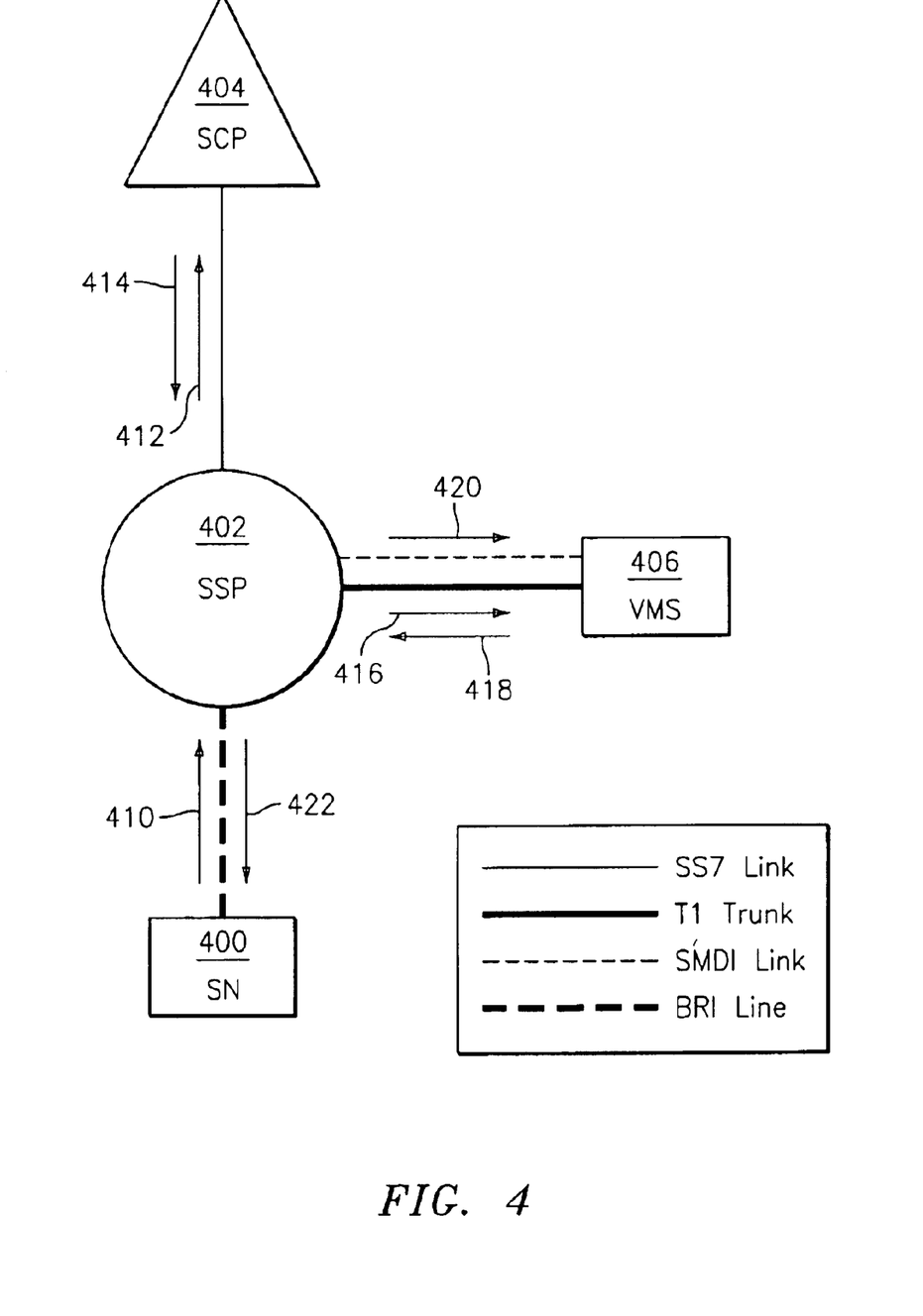
FIG. 4 is a block diagram illustrating the interaction between the components of FIG. 1, in accordance with another embodiment of the present information.
Figure 5:
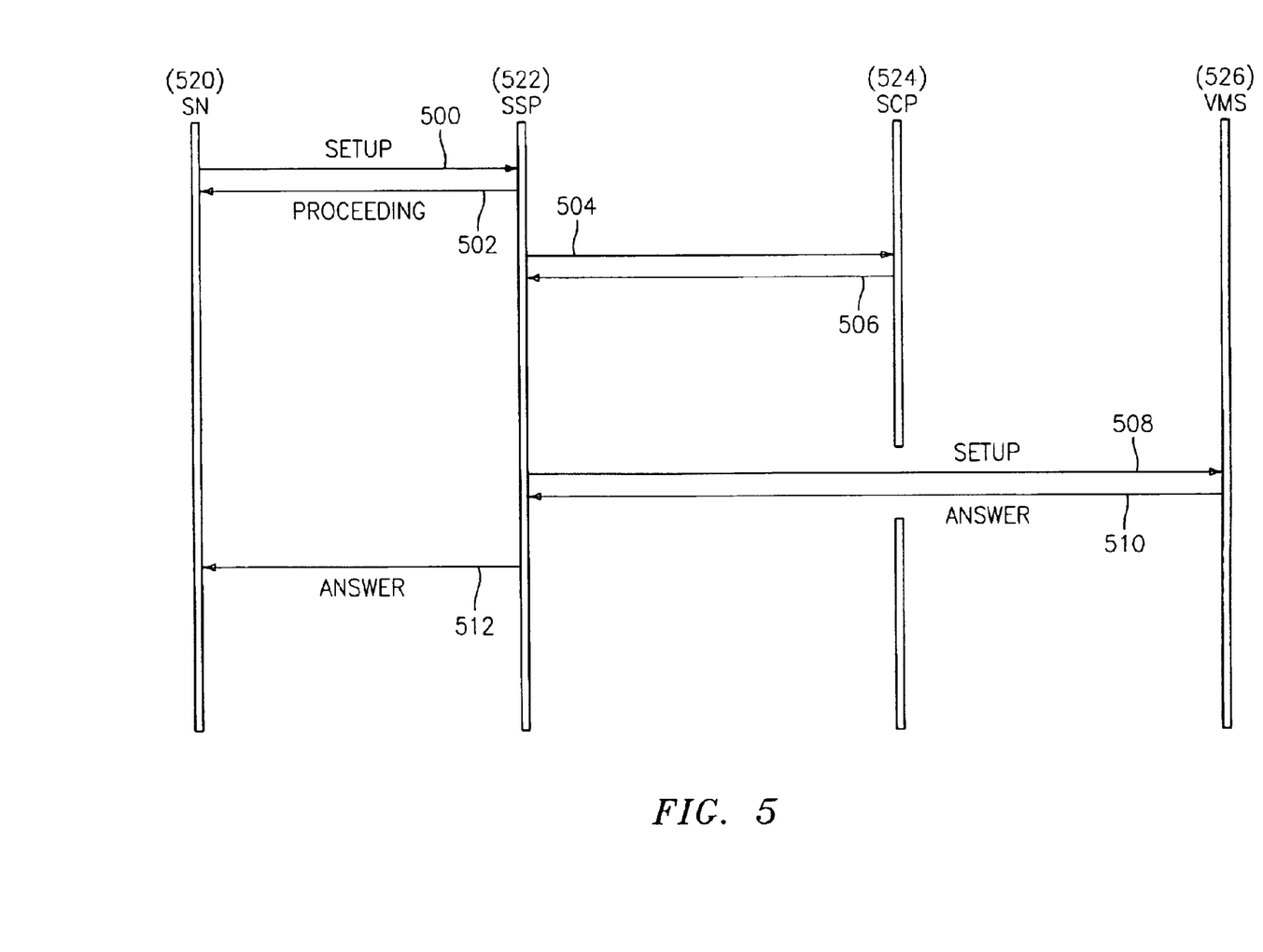
FIG. 5 is a block diagram illustrating the messaging between the components of FIG. 1, in accordance with another embodiment of the present information.

FIG. 4 illustrates the interactions between the SN 400, the SSP 402, the SCP 404, and the VMS 406 using a single set of messages. A service logic program executes on the SN 400 and determines that a call should be placed to the VMS 406. Once the service logic program determines that a call should be placed to the VMS 406, then a CDP trigger occurs. The CDP is the same dialing pattern that was described above in connection with FIG. 2.

A message 410 containing the CDP is sent from the SN 400 to the SSP 402. In response to receiving the message containing the CDP, the SSP 402 launches a query message 412 to the SCP 404. The parameters of the query message 412 include the digits from the CDP. In response to receiving the query message 412, the SCP 404 reviews the parameters in the query message to determine whether the call is a voice mail call. If the call is a voice mail call, then the SCP 404 determines the voice mail access number for the call. The SCP 404 determines the voice mail access number by searching a database associated with the SCP 404 for the voice mail access number that corresponds to the subscriber's identifier. The SCP 404 includes the voice mail access number in a response message 414 back to the SSP 402. The response message 414 also sets the original called party number and the last redirecting party number to the directory number of the subscriber. Setting the original called party number to the directory number of the subscriber instructs the SSP 402 to route the call to the subscriber's directory number.

Once the SSP 402 receives the response message 414, the SSP 402 sets up a call 416 to the VMS 406 and sends call integration information 420 over the VMS's SMDI link. The call integration information 420 identifies both the original called party number and the last redirecting party number parameter as the subscriber's directory number. Therefore, the call is correctly identified as bound for the subscriber's voice mailbox. The VMS answers the call 418 and the SN is connected 422 to the VMS 406.

The messaging between the SN, the SSP, the SCP, and the VMS can be further illustrated by reference to FIG. 5. The vertical lines in FIG. 5 represent the elements of the telephone network. The horizontal lines shown in FIG. 5 illustrate the messaging between the elements. The messaging begins with the SETUP message 500 and the PROCEEDING message 502 between the SN 520 and the SSP 522. The SETUP message 500 includes the CDP, as described above in connection with FIG. 2. In response to receiving the message using the CDP, the SSP 522 causes a query message 504 to be sent to the SCP 524. The SCP 524 responds to the query message 504 with a response message 506. The response message 506 sets the original called party number and the last redirecting party number to the subscriber's directory number. The response message 506 also includes the voice mail access number that corresponds to the subscriber's directory number. The voice mail access number is determined by searching a database located in the SCP 524.

Upon receipt of the response message 506, the SSP 522 sets up a call 508 to the VMS 526 and sends call integration information over the SMDI link. Once the VMS 526 answers 510 the call, the SN 520 completes the call 512. For example, the SN 520 can complete the call by connecting the VMS 526 to a previously existing call or executing a call transfer operation to connect the voice mail call to a previously existing call.

In another alternative embodiment of the present invention, a different trigger could be used instead of the CDP trigger at the SN. For example, an OFF-HOOK_IMMEDIATE trigger could be used instead of the CDP trigger. If an OFF-HOOK_IMMEDIATE trigger is used, then an SCP query is launched for every call received at the SN regardless of whether the SN originates a call to the VMS. As will be apparent to those skilled in the art, additional alternatives that include an originating trigger and an interpretation of the dialing pattern to recognize that the call is a call to the VMS are also possible.

Additional alternative embodiments will be apparent to those skilled in the art to which the present invention pertains without departing from its spirit and scope. Accordingly, the scope of the present invention is described by the appended claims and is supported by the foregoing description.

What is claimed is:

1. A method for routing a call to a voice mail system, comprising:

receiving a call at a service node;

determining whether the call is directed to the voice mail system;

if the call is directed to the voice mail system, then formulating a first message that includes an access code indicating that the call is a voice mail call and a directory number associated with a subscriber;

sending the first message from the service node to a service switching point;

in response to receiving the first message, formulating a second message that includes the directory number associated with the subscriber;

sending the second message from the service switching point to a service control point;

formulating the third message that sets original called party number to the directory number associated with the subscriber;

sending the third message from the service control point to the service switching point;

formulating a fourth message that includes a voice mail access number corresponding to the directory number and sets a last redirecting party number to the directory number, after the service control point determines the voice mail access number by searching a database associated wvith the service control point;

sending the fourth message from the service control point to the service switching point; and sending call integration information from the service switching point to the voice mail system, wherein the call integration information identifies both the original called party number and the last redirecting party number as the directory number associated with the subscriber such that the call is identified as bound for the subscriber's mailbox in the voice mail system, regardless whether the call integration information is derived using the original called party number or the last redirecting party number.

2. The method of claim 1, wherein the first message is a custom dialing pattern message.

3. The method of claim 1, wherein the second message is an INFO_ANALYZED query message.

4. The method of claim 1, wherein the third message is an ANALYZE_ROUTE response message.

5. A system for routing a voice mail call to a voice mail system, comprising:

a service node for receiving a call, originating the voice mail call and formulating a message that includes a voice mail indicator and a subscriber identifier;

a service switching point for receiving the message from the service node and in response, formulating a query message that requests routing information, and sending the routing information to the voice mail system;

a service control point for receiving the query message from the service switching point and in response, accessing a database associated with the service control point to obtain a voice mail access number corresponding to the subscriber identifier, and formulating a response message that includes the routing information, the routing information comprising the voice mail access number, an original called party number set to the subscriber identifier, and a last redirecting party number set to the subscriber identifier, whereby the call is identified as bound for the subscriber's mailbox in the voice mail system, regardless whether the call integration information is derived using the original called party number or the last redirecting party number.

6. The system of claim 5, wherein the voice mail indicator and the subscriber identifier comprise a custom dialing pattern.

7. The system of claim 5, wherein the query message is an INFO_ANALYZED query message.

8. The system of claim 5, wherein the response message is an ANALYZE_ROUTE response message.

9. The system of claim 5, wherein the service switching point formulates a second query message.

10. The system of claim 9, wherein the second query message is a TERMINATION_ATTEMPT query message.

11. The system of claim 5, wherein the service control point formulates a second response message.

12. system of claim 11, wherein the second response message is a FORWARD_CALL response message.

13. A method for routing a voice mail call to a voice mail system, comprising:

receiving a call at a service node;

originating the voice mail call by sending a custom dialing pattern message that includes an access code identifying the voice mail call and a subscriber identifier to a service switching point;

in response to receiving the custom dialing pattern message, sending a first query message requesting routing information from the service switching point to a service control point;

in response to receiving the first query message at the service control point, sending a first response message including instructions to route the call to a directory number corresponding to the subscriber identifier and setting an original called party number to the directory number;

sending a second query message fron the service switching point to the service control point;

in response to receiving the second query message at the service control point, determining a voice mail access number corresponding to the subscriber identifier by searching a database associated with the service switching point and sending a second response message including the voice mail access number and setting a last redirecting party number to the directing number; and in response to receiving the second response message at the service switching point, sending call integration information from the service switching point to the voice mail system that identifies both the original called party number and the last redirecting party number as the directory number such that the call is identified as bound for the subscriber's mailbox in the voice mail system, regardless whether the call integration information is derived using the original called party number or the last redirecting party number.

14. The method of claim 13, wherein the subscriber identifier is the directory number.

15. The method of claim 13, wherein the first query message is an INFO_ANALYZED query message.

16. The method of claim 13, wherein the first response message is an ANALYZE_ROUTE response message.

17. The method of claim 13, wherein the second query message is a TERMINATION_ATTEMPT query message.

18. The method of claim 13, wherein the second response message is a FORWARD_CALL response message.

* * * * *